US010257114B2

(12) United States Patent
Yuan et al.

(10) Patent No.: US 10,257,114 B2
(45) Date of Patent: Apr. 9, 2019

(54) METHOD AND APPARATUS FOR ALLOCATING NETWORK MEDIUM RESOURCES

(71) Applicant: Tencent Technology (Shenzhen) Company Limited, Shenzhen (CN)

(72) Inventors: Shenxing Yuan, Shenzhen (CN); Yefeng Yuan, Shenzhen (CN); Yu Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 509 days.

(21) Appl. No.: 14/970,213

(22) Filed: Dec. 15, 2015

(65) Prior Publication Data

US 2016/0099885 A1 Apr. 7, 2016

Related U.S. Application Data

(63) Continuation of application No. PCT/CN2014/082204, filed on Jul. 15, 2014.

(30) Foreign Application Priority Data

Aug. 1, 2013 (CN) .......................... 2013 1 0330407

(51) Int. Cl.
*G06F 9/50* (2006.01)
*H04L 5/00* (2006.01)
(Continued)

(52) U.S. Cl.
CPC .............. *H04L 47/822* (2013.01); *G06F 9/50* (2013.01); *G06F 17/3089* (2013.01); *H04L 5/003* (2013.01)

(58) Field of Classification Search
CPC ....................................................... G06F 9/20
See application file for complete search history.

(56) References Cited

U.S. PATENT DOCUMENTS

| 7,860,752 B2 | 12/2010 | Boyd |
| 2008/0059215 A1 | 3/2008 | Boyd |

(Continued)

FOREIGN PATENT DOCUMENTS

| CN | 1697511 A | 11/2005 |
| CN | 101365153 A | 2/2009 |

(Continued)

OTHER PUBLICATIONS

Tencent Technology, ISRWO, PCT/CN2014/082204, Oct. 22, 2014, 7 pgs.

(Continued)

*Primary Examiner* — Shirley X Zhang
(74) *Attorney, Agent, or Firm* — Morgan, Lewis & Bockius LLP

(57) ABSTRACT

A method for estimating allocatable network medium data resources is disclosed. The method is performed at an apparatus having one or more processors and memory for storing programs to be executed by the one or more processors. The method includes receiving a screening condition that includes at least one dimension from a set of dimensions of the network medium data resources. The method also includes obtaining allocation data of the network medium data resources, where the allocation data includes at least allocatable network medium data resources within a predefined geographical region, allocatable network medium data resources associated with a predefined content, a total volume of the allocatable network medium data resources, and a set of ratios associated with the set of dimensions. The method further includes calculating an estimated allocatable resource volume of the network medium data resources for the screening condition using the obtained allocation data.

15 Claims, 5 Drawing Sheets

(51) Int. Cl.
*H04L 12/911* (2013.01)
*G06F 17/30* (2006.01)

(56) References Cited

U.S. PATENT DOCUMENTS

| | | | | |
|---|---|---|---|---|
| 2010/0082422 | A1* | 4/2010 | Heilig | G06Q 30/02 |
| | | | | 705/14.41 |
| 2014/0297400 | A1* | 10/2014 | Sandholm | G06Q 30/0243 |
| | | | | 705/14.42 |
| 2015/0025962 | A1* | 1/2015 | Becket | G06Q 30/0277 |
| | | | | 705/14.48 |
| 2015/0302472 | A1* | 10/2015 | Zhang | G06Q 30/02 |
| | | | | 705/14.52 |
| 2018/0136975 | A1* | 5/2018 | Chitilian | G06F 9/542 |

FOREIGN PATENT DOCUMENTS

| | | |
|---|---|---|
| CN | 102542438 A | 7/2012 |
| CN | 106077468 A | 5/2013 |
| EP | 2565836 A1 | 3/2013 |

OTHER PUBLICATIONS

Tencent Technology, ISRWO, PCT/CN2014/083418, Nov. 6, 2014, 7 pgs.

* cited by examiner

FIG. 2

METHOD AND APPARATUS FOR ALLOCATING NETWORK MEDIUM RESOURCES

PRIORITY CLAIM AND RELATED APPLICATIONS

This application is a continuation application of PCT Patent Application No. PCT/CN2014/082204, entitled "METHOD AND APPARATUS FOR ALLOCATING NETWORK MEDIUM RESOURCES" filed on Jul. 15, 2014, which claims priority to Chinese Patent Application No. 201310330407.6, entitled "METHOD AND APPARATUS FOR ALLOCATING NETWORK MEDIUM RESOURCES," filed on Aug. 1, 2013, both of which are incorporated herein by reference in their entirety. This application is related to U.S. patent application Ser. No. 14/970,256, entitled "METHOD AND APPARATUS FOR ALLOCATING NETWORK MEDIUM DATA RESOURCES", filed on Dec. 15, 2015, which is incorporated herein by reference in its entirety.

TECHNICAL FIELD

The present application generally relates to the field of Internet data processing technologies, and more particularly to a method and apparatus for allocating network medium resources.

BACKGROUND

With the rapid development of Internet in recent years, technologies for processing and presenting network medium information have been widely implemented in various industries. Some known control systems allocate network medium data resources in the Internet based on estimated demands for the network medium data resources from user groups. Such a demand for the network medium data resources is typically associated with a screening condition containing information of multiple dimensions such as, for example, time of display, region of audience, display position, characteristics of audience (e.g., age, gender), and/or the like. In allocating network medium data resources, the known control systems typically estimate allocatable network medium data resources for a given screening condition by multiplying a total volume of network medium data resources with a corresponding ratio associated with that screening condition. Such a method for estimating allocatable network medium data resources, however, results in low accuracy of estimation and low utilization of available network medium data resources, thus potentially causing substantial waste of network medium data resources.

Therefore, a need exists for a method and apparatus that can improve accuracy in estimating allocatable network medium data resources and utilization of available network medium data resources, thus reducing waste of network medium data resources.

SUMMARY

The above deficiencies associated with the known control systems may be addressed by the techniques described herein.

In some embodiments, a method for estimating allocatable network medium data resources is disclosed. The method is performed at an apparatus having one or more processors and memory for storing programs to be executed by the one or more processors. The method includes receiving a screening condition of the network medium data resources. The screening condition includes at least one dimension from a set of dimensions of the network medium data resources. In some instances, the dimension included in the screening condition is one of, for example, a display position of the network medium data resources, gender of audience, age of audience, region of audience, time of display, scene of display, content of the network medium data resources, frequency of display, and duration of an attached content.

The method also includes obtaining allocation data of the network medium data resources, where the allocation data includes at least allocatable network medium data resources within a predefined geographical region, allocatable network medium data resources associated with a predefined content, a total volume of the allocatable network medium data resources, and a set of ratios associated with the set of dimensions of the network medium data resources.

The method further includes calculating an estimated allocatable resource volume of the network medium data resources for the screening condition using the obtained allocation data of the network medium data resources. In some instances, the calculating the estimated allocatable resource volume includes the following steps.

First, the calculating the estimated allocatable resource volume includes, in accordance with the screening condition including the predefined geographical region, calculating a first estimated allocatable resource volume using the allocatable network medium data resources within the predefined geographical region and a ratio associated with the predefined geographical region. The ratio associated with the predefined geographical region is from the set of ratios associated with the set of dimensions of the network medium data resources. In some instances, the first estimated allocatable resource volume is zero in accordance with the screening condition not including any predefined geographical region.

Second, the calculating the estimated allocatable resource volume includes, in accordance with the screen condition including the predefined content, calculating a second estimated allocatable resource volume using the allocatable network medium data resources associated with the predefined content and a ratio associated with the predefined content. The ratio associated with the predefined content is from the set of ratios associated with the set of dimensions of the network medium data resources. In some instances, the second estimated allocatable resource volume is zero in accordance with the screening condition not including any predefined content.

Third, the calculating the estimated allocatable resource volume includes, calculating a third estimated allocatable resource volume based on the total volume of the allocatable network medium data resources and the set of ratios excluding the ratio associated with the predefined geographical region and the ratio associated with the predefined content.

Last, the calculating the estimated allocatable resource volume includes adding up the first, second, and third estimated allocatable resource volumes as the estimated allocatable resource volume of the network medium data resources for the screening condition.

In some instances, the method includes, prior to receiving the screening condition, receiving another screening condition of the network medium data resources. At least portions of the two screening conditions overlap. In such instances, the method includes calculating a conflict resource volume of the network medium data resources corresponding to the overlap between the two screening conditions, and then calculating a residual resource volume of the network medium data resources based on the conflict resource volume and the estimated allocatable resource volume. Such a residual resource volume can be calculated by subtracting the conflict resource volume from the estimated allocatable resource volume. The method further includes determining an allocatable resource volume of the network medium data resources based on the residual resource volume. Such an allocatable resource volume can be equal to the residual resource volume or the lower of the residual resource volume and a predefined threshold of resource volume.

In some embodiments, an apparatus includes one or more processors and memory storing one or more programs for execution by the one or more processors. The one or more programs include instructions that cause the apparatus to perform the method for estimating allocatable network medium data resources as described above. In some embodiments, a non-transitory computer readable storage medium stores one or more programs including instructions for execution by one or more processors. The instructions, when executed by the one or more processors, cause the processors to perform the method for estimating allocatable network medium data resources at an apparatus as described above.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the application when taken in conjunction with the drawings.

FIG. 2 is a schematic diagram illustrating a user interface used in estimating allocatable network medium data resources in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In some embodiments, network medium data resources discussed herein can be calculated based on a common specific time cycle such as, for example, per hour, per day, per week, per month, etc. For example, an estimated allocatable resource volume of the network medium data resources is an estimated allocatable resource volume for a day; allocatable network medium data resources within a predefined geographical region are allocatable network medium data resources within that predefined geographical region for a week; allocatable network medium data resources associated with a predefined content are allocatable network medium data resources associated with that predefined content for an hour; a total volume of allocatable network medium data resources is a total volume of the allocatable network medium data resources for a day; and/or the like. In the following embodiments, network medium data resources discussed herein are defined based on a per-day time cycle by default unless otherwise specified. Additionally, a unit used to measure the network medium data resources can be, for example, cost per mile (CPM) (i.e., the advertising cost per thousand views).

In some embodiments, allocatable network medium data resources discussed herein can be an inventory volume, which is associated with (e.g., refers to or measures) exposure of corresponding network medium data resources that are available to be presented to users. Such allocatable network medium data resources can be measured by, for example, a number of views by users on a video clip or an advertisement that contains corresponding content of the network medium data resources. In some embodiments, application requests described herein can include order information. In such embodiments, a virtual application request can include virtual order information, where a requested volume included in the virtual application request can be a requested volume of the virtual order.

In order to make the objectives, technical solutions, and advantages of the present application comprehensible, embodiments of the present application are further described in detail below with reference to the accompanying drawings.

Figure 1:
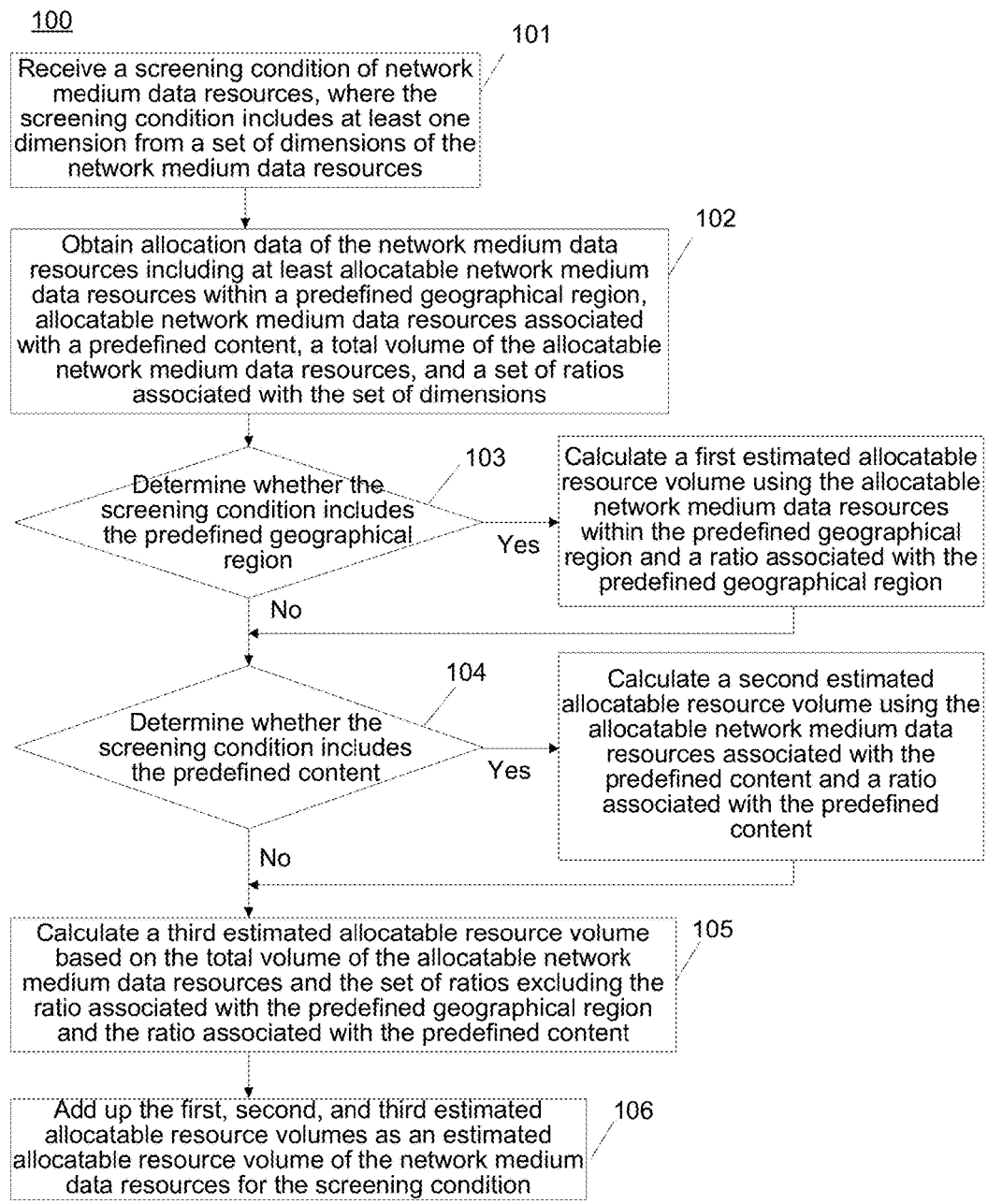
FIG. 1 is a flow chart illustrating a method performed at an apparatus for estimating allocatable network medium data resources in accordance with some embodiments.

FIG. 1 is a flow chart illustrating a method 100 performed at an apparatus for estimating allocatable network medium data resources in accordance with some embodiments. Such an apparatus can be configured to be operatively coupled to and communicate with one or more other devices such as, for example, a terminal device, a server device, etc. The apparatus can be configured to be operatively coupled to one or more networks such as, for example, the Internet. The apparatus can be operated by one or more users. In some embodiments, the apparatus can be included in a single physical device. In other embodiments, the apparatus can include at least portions of multiple physical devices.

In some embodiments, the apparatus performing the method 100 can be any type of device that is configured to collect and process data and/or information for estimating allocatable network medium data resources. Such an apparatus can typically be configured to communicate with one or more devices (e.g., terminal devices, server devices, networking devices, etc.) via one or more networks. In some embodiments, the apparatus can be, for example, a background server, a back end server, a database server, a workstation, a desktop computer, a cloud computing server, a data processing server, a personal computer, a smart phone, a mobile Internet device (MID), a personal digital assistant (PDA), a palmtop computer, a tablet computer, a laptop computer, a handheld computer, and/or the like. In some embodiments, the apparatus can be a cluster or data center consisting of two or more devices (e.g., a data processing server and a database server). Details of such an apparatus are shown and described below with respect to FIGS. 5-6.

In some embodiments, a network operatively coupled to the apparatus performing the method 100 can be any type of network configured to operatively couple one or more such apparatuses to one or more other devices, and enable communications between the apparatus(es) and the connected device(s). In some embodiments, such a network can include one or more networks such as, for example, a cellular network, a satellite network, a local area network (LAN), a wide area network (WAN), a wireless local area network (WLAN), Internet, etc. In some embodiments, such a network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

In some embodiments, the apparatus performing the method 100 can include one or more processors and memory. In such embodiments, the method 100 is governed by instructions or code of an application that are stored in a non-transitory computer readable storage medium of the apparatus and executed by the one or more processors of the apparatus. The application is associated with estimating allocatable network medium data resources. As a result of the application being executed at the one or more processors of the apparatus, the method 100 is performed at the apparatus. As shown in FIG. 1, the method 100 includes the following steps.

At 101, the apparatus receives a screening condition of network medium data resources. The screening condition includes at least one dimension from a set of dimensions of the network medium data resources. In some embodiments, the apparatus can receive the screening condition from a device (e.g., a terminal device, a user device) operatively coupled to the apparatus. In some other embodiments, a user operating the apparatus can enter the screening condition into the apparatus using a suitable input device (e.g., a keyboard, a mouse).

A screening condition represents a restriction or a collection of restrictions on how network medium data resources are allocated. A dimension included in a screening condition represents a restriction in one aspect of the network medium data resources and/or targeted audience of the network medium data resources. In other words, each dimension from the set of dimensions can be a characteristic, feature, restriction, etc., in one aspect of the network medium data resources and/or audience of the network medium data resources. In some embodiments, the set of dimensions of the network medium data resources can include, for example, a display position of the network medium data resources, gender of audience, age of audience, region of audience, time of display, scene of display, content of the network medium data resources, frequency of display, duration of an attached content, and/or the like.

Figure 2:
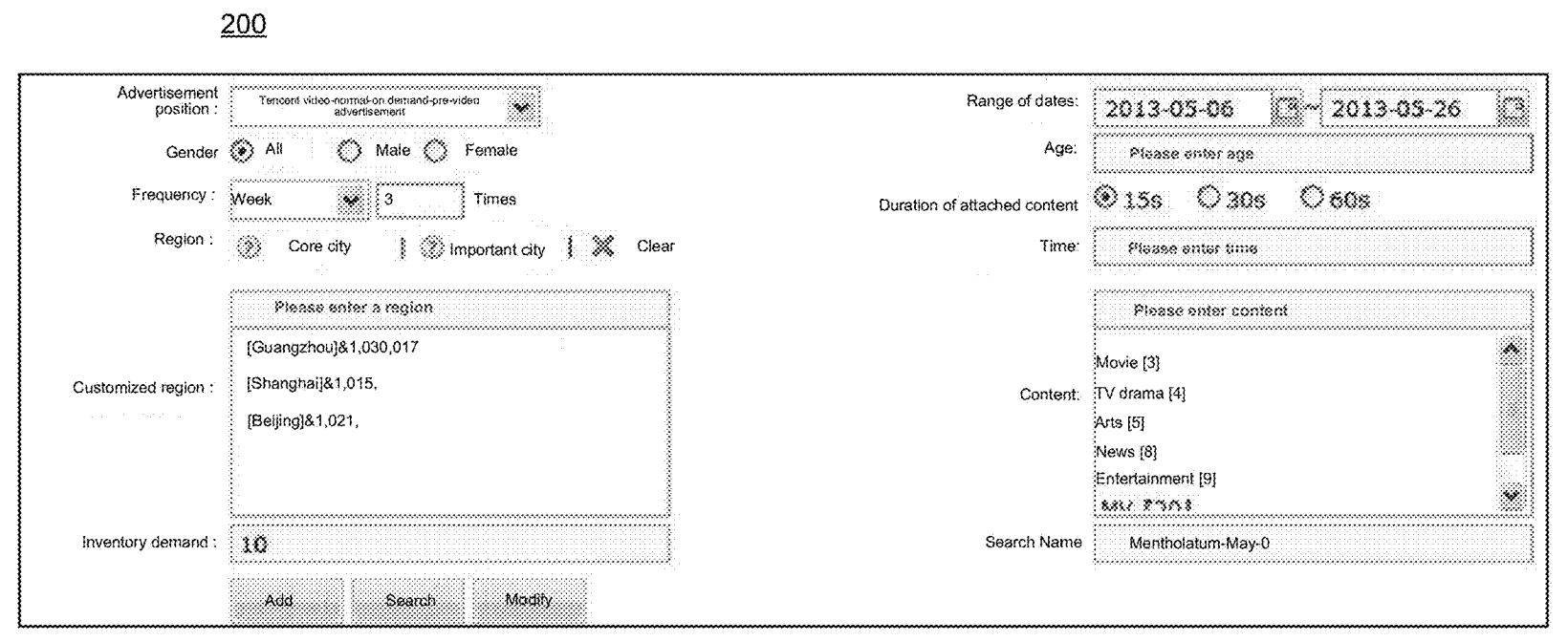

FIG. 2 is a schematic diagram illustrating a user interface 200 used in estimating allocatable network medium data resources in accordance with some embodiments. The user interface 200 can be presented by the apparatus (e.g., displayed in a screen of the apparatus) performing the method 100 to a user, thus prompting the user to provide a screening condition associated with estimating allocatable network medium data resources. For example, the apparatus can display the user interface 200 in a screen of the apparatus, thus prompting the user to enter data defining dimensions that form the screening condition.

As shown in FIG. 2, the dimensions included in the screening condition include a display position of the network medium data resources (i.e., "Advertisement position"), a gender of the targeted audience (i.e., "Gender"), a frequency of display (i.e., "Frequency"), a region of audience (i.e., "Region", "Customized region"), a requested volume (i.e., "Inventory demand"), a time of display (i.e., "Range of dates", "Time"), an age of the targeted audience (i.e., "Age"), a duration of attached content (i.e., "Duration of attached content"), content of the network medium data resources (i.e., "Content"), etc. Furthermore, the user interface 200 prompts the user to define a search name (e.g., "Mentholatum-May-0") for the screening condition, such that the user can use the same search name to repeat the search process without entering data for any of the dimensions again.

As shown in FIG. 2, the user interface 200 also includes an "Add" button to add dimensions into a screening condition to be defined, a "Search" button to activate the search process in accordance with the defined screening condition, and a "Modify" button to modify entered data. After entering data to each dimension included in the screening condition, the user can click the "Search" button to activate the search process. As a result, subsequent operations of the method 100 are performed at the apparatus to estimate allocatable network medium data resources based on the screening condition.

Returning to FIG. 1, at 102, the apparatus obtains allocation data of the network medium data resources including at least 1) allocatable network medium data resources within a predefined geographical region, 2) allocatable network medium data resources associated with a predefined content, 3) a total volume of the allocatable network medium data resources, and 4) a set of ratios associated with the set of dimensions. In some embodiments, the apparatus can obtain the allocation data from a data source such as, for example, a data center, a database server, and/or the like. In some other embodiments, a user operating the apparatus can (manually) input the allocation data into the apparatus. In yet some other embodiments, the apparatus can receive the allocation data from an existing control system of network medium data resources (e.g., via a data interface).

In some embodiments, the predefined geographical region is associated with a dimension (e.g., region of audience) included in the screening condition. The predefined geographical region can be a region associated with the targeted audience for the network medium data resources. Such a geographical region typically is a geographical region where a majority of the targeted audience are located, and/or a geographical region into which general network medium data resources are more exposed and distributed. Such a predefined geographical region can be, for example, New York, Los Angeles, Chicago, or any other big city. In some embodiments, a predefined geographical region is referred to as a core region, a key region, a critical region, or the like, and any region that is not a predefined geographical region is referred to as an ordinary geographical region.

In some embodiments, for any given type of network medium data resources, the number of predefined geographical regions can be changed based on allocation of that type of network medium data resources across different regions. In some embodiments, allocatable network medium data resources within a predefined geographical region can be estimated by the existing control system of network medium data resources based on monitoring data of the allocatable network medium data resources within that predefined geographical region. For example, the existing control system can monitor data collected everyday to estimate allocatable network medium data resources for New York, Los Angeles, Chicago, etc., on each day.

In some embodiments, the predefined content is associated with a dimension (e.g., content of network medium data resources) included in the screening condition. The predefined content can be associated with one or more specific types of network medium data that are more exposed and/or distributed than other types of network medium data. In other words, the predefined content can be content that is more popular with general audience or public than other content. Such a predefined content can be content of, for example, movies, TV episodes, news, entertainment shows, and/or the like. In some embodiments, a predefined content is referred to as core content, a key content, a popular content, or the like, and any content that is not a predefined content is referred to an ordinary content.

In some embodiments, the number of different predefined content can be changed based on allocation of the network medium data resources. In some embodiments, allocatable network medium data resources associated with a predefined content can be estimated by the existing control system of network medium data resources based on monitoring data of the allocatable network medium data resources associated with that predefined content across all geographical regions (including predefined geographical regions and ordinary geographical regions). For example, the existing control system can monitor data collected everyday to estimate allocatable network medium data resources for movie, TV episodes, etc., across all geographical regions on each day.

In some embodiments, the apparatus receives the allocatable network medium data resources associated with a predefined content directly from an existing control system of network medium data resources (e.g., via a data interface). In such embodiments, the allocatable network medium data resources associated with the predefined content are estimated based on monitoring data at the existing control system.

In some other embodiments, the apparatus receives, directly from an existing control system of network medium data resources (e.g., via a data interface), a total number of video views (VV) of a predefined content instead of allocatable network medium data resources associated with that predefined content. In such embodiments, the apparatus can calculate the allocatable network medium data resources associated with the predefined content based on the received total number of video views of the predefined content as follows.

Specifically, a video is typically accompanied by one or more attached clips (e.g., advertisements) that are played at a certain time associated with the play of the video. For example, a clip attached to a video can be played prior to, in the middle of, and/or right after the play of the video. Thus, a video that has a number M of video views and is accompanied with three attached clips can potentially present content of the clips for up to 3×M times. Therefore, the desired allocatable network medium data resources associated with the predefined content, measured by a number of views on the attached clips, can be calculated as a product of a total number M of views of the video (which can be obtained from the existing control system) with a number N of clips attached to that video. That is, the allocatable network medium data resources associated with the predefined content can be calculated as M×N. Furthermore, in some embodiments, a loss ratio K can be used to factor loss in the process into the calculation, where K is a number between zero and one (e.g., 0.8). In such embodiments, the allocatable network medium data resources associated with the predefined content can be calculated as M×N×K.

In some embodiments, the total volume of the allocatable network medium data resources is an estimated sum of allocatable network medium data resources calculated for every dimension included in the set of dimensions. Thus, the estimated allocatable resource volume of the network medium data resources for the screening condition is typically a subset of the total volume of the allocatable network medium data resources.

In some embodiments, each ratio from the set of ratios is associated with a dimension from the set of dimensions, which is defined as a ratio of allocatable network medium data resources restricted within that dimension over a total value of certain allocatable network medium data resources. In some embodiments, a ratio from the set of ratios can be associated with a single dimension or multiple dimensions from the set of dimensions. For example, the set of ratios can include a ratio of female audience from New York over all audience from New York, a ratio of audience from New York over all audience, a ratio of allocatable network medium data resources associated with a given TV episode over allocatable network medium data resources associated with all TV episodes, a ratio of allocatable network medium data resources associated with all TV episodes over allocatable network medium data resources of all contents, a ratio of allocatable network medium data resources associated with the first clips attached to TV programs on finance over allocatable network medium data resources associated with all TV programs on finance, and/or the like.

In some embodiments, a ratio not included in the set of ratios (thus not obtained at the apparatus) can be determined based on related ratios from the set of ratios. For example, a ratio of female audience from New York over all audience from New York can be calculated as a ratio of female audience from New York over all audience divided by a ratio of all audience from New York over all audience. That is, female audience from New York/all audience from New York=(female audience from New York/all audience)/(all audience from New York/all audience).

Although shown and described with respect to FIG. 1 as the step of 102 being performed after the step of 101, in other embodiments, the steps of 101 and 102 can be performed in any other suitable order. For example, the step of 102 can be performed prior to or concurrently with (e.g., at substantially the same time as) performing of the step of 101.

At 103, the apparatus determines whether the screening condition includes the predefined geographical region. If the apparatus determines that the screening condition includes the predefined geographical region, the apparatus then calculates a first estimated allocatable resource volume using the allocatable network medium data resources within the predefined geographical region and a ratio associated with the predefined geographical region. Specifically, the first estimated allocatable resource volume can be calculated by multiplying the allocatable network medium data resources within the predefined geographical region with the ratio associated with the predefined geographical region. Otherwise, if the apparatus determines that the screening condition does not include the predefined geographical region, the process then moves to the next step of 104.

In some embodiments, the ratio associated with the predefined geographical region can be, for example, a ratio of allocatable network medium data resources within the predefined geographical region over allocatable network medium data resources of all geographical regions. Such a ratio can be included in the set of ratios obtained at the apparatus or calculated based on related ratios from the set of ratios.

In some embodiments, if the apparatus determines that the screening condition does not include the predefined geographical region, the apparatus can assign the first estimated allocatable resource volume to be zero. After the apparatus determines a value for the first estimated allocatable resource volume (e.g., assigned to be zero or calculated as described above), the apparatus moves the process to the next step of 104.

At 104, the apparatus determines whether the screening condition includes the predefined content. If the apparatus determines that the screening condition includes the predefined content, the apparatus then calculates a second estimated allocatable resource volume using the allocatable network medium data resources associated with the predefined content and a ratio associated with the predefined content. Specifically, the second estimated allocatable resource volume can be calculated by multiplying the allocatable network medium data resources associated with the predefined content with the ratio associated with the predefined content. Otherwise, if the apparatus determines that the screening condition does not include the predefined content, the process then moves to the next step of 105.

In some embodiments, the ratio associated with the predefined content can be, for example, a ratio of allocatable network medium data resources associated with the predefined content over allocatable network medium data resources of all contents. Such a ratio can be included in the set of ratios obtained at the apparatus or calculated based on related ratios from the set of ratios.

In some embodiments, if the apparatus determines that the screening condition does not include the predefined content, the apparatus can assign the second estimated allocatable resource volume to be zero. After the apparatus determines a value for the second estimated allocatable resource volume (e.g., assigned to be zero or calculated as described above), the apparatus moves the process to the next step of 105.

At 105, the apparatus calculates a third estimated allocatable resource volume based on the total volume of the allocatable network medium data resources and the set of ratios excluding the ratio associated with the predefined geographical region and the ratio associated with the predefined content.

As a result of the calculation, the first estimated allocatable resource volume represents a portion of the desired allocatable network medium data resources that is restricted by the predefined geographical region; the second estimated allocatable resource volume represents another portion of the desired allocatable network medium data resources that is restricted by the predefined content but not restricted by the predefined geographical region; and the third estimated allocatable resource volume represents the remaining portion of the desired allocatable network medium data resources that is not restricted by the predefined geographical region or the predefined content. Thus, at 106, the apparatus adds up the first, second, and third estimated allocatable resource volumes as the estimated allocatable resource volume of the network medium data resources for the screening condition.

For example, the dimensions contained in the screening condition received at the apparatus include New York, Santa Barbara, female, first clips attached to TV episodes, and first clips attached to finance videos. Such a screening condition indicates to estimate allocatable network medium data resources for first clips attached to TV episodes and first clips attached to finance videos that are watched by female audience from New York and Santa Barbara. Among those dimensions, assume that New York is a predefined geographical region, and TV episodes are a predefined content.

According to 102, allocation data associated with the screening condition and the dimensions is obtained at the apparatus, including allocatable network medium data resources within New York, allocatable network medium data resources associated with TV episodes, a total volume of allocatable network medium data resources, a set of ratios associated with the dimensions included in the screening condition, etc.

According to the method 100, the first priority is to estimate a first portion of the desired allocatable network medium data resources (i.e., the first estimated allocatable resource volume) using the allocatable network medium data resources within predefined geographical region(s). Specifically, according to 103, the apparatus can calculate the first estimated allocatable resource volume by multiplying the allocatable network medium data resources within New York with a corresponding ratio associated with New York from the set of ratios. In some embodiments, the allocatable network medium data resources within New York can be received from a data interface of an existing control system of network medium data resources, or calculated based on other estimated data provided by the existing control system.

The calculation is: the first estimated allocatable resource volume=a total estimated volume of allocatable network medium data resources in New York×a ratio of female audience in New York over all audience in New York×(a ratio of allocatable network medium data resources for first clips attached to TV episodes over all allocatable network medium data resources+a ratio of allocatable network medium data resources for first clips attached to finance videos over all allocatable network medium data resources). The ratio associated with New York refers to the product of the ratio of female audience in New York over all audience in New York with the sum of the ratio of allocatable network medium data resources for first clips attached to TV episodes over all allocatable network medium data resources and the ratio of allocatable network medium data resources for first clips attached to finance videos over all allocatable network medium data resources. As a result, such a ratio associated with New York represents a ratio of female audience from New York who watch first clips attached to TV episodes and first clips attached to finance videos over all audience from New York.

In some embodiments, one or more ratios from the three ratios used in the calculation can be obtained from an existing control system of network medium data resources (e.g., via a data interface). In some embodiments, a ratio not provided by the existing control system can be calculated based on other available ratios from the set of ratios. For example, a ratio of female audience from New York over all audience from New York can be calculated as a ratio of female audience from New York over all audience divided by a ratio of all audience from New York over all audience.

In some embodiments, the two ratios associated with first clips attached to TV episodes and first clips attached to finance videos are ratios associated with content. Such a ratio associated with a particular content can be calculated in Steps 1-2 as follows. Step 1: calculate a ratio of allocatable network medium data resources for that particular content over allocatable network medium data resources for all contents according Steps 1.1-1.4 as follows.

Step 1.1: obtain, from the existing control system (e.g., via a data interface), a proportion of network medium data resources for different attached clips. For instance, a maximum of three clips (e.g., advertisements) can be attached to a piece of any type of content (e.g., a TV episode, a finance video). Based on historical data obtained by monitoring from the existing control system, it can be determined that the proportion of allocatable network medium data resources for the three attached clips is 4:3:3. That is, network medium data resources allocated for the first, second and third clips are 40%, 30% and 30%, respectively, of the total allocatable network medium data resources for the attached clips.

Step 1.2: obtain, from the existing control system (e.g., via a data interface), a total volume of allocatable network medium data resources for the particular content (denoted as RP(x) where x represents the particular content), and the number of attached clips supported by the particular content. If the content is a predefined content (e.g., TV episodes), then the obtained RP(x) is the allocatable network medium data resources associated with the content (e.g., the allocatable network medium data resources associated with TV episodes) obtained at 102 as described above. Such allocatable network medium data resources associated with a predefined content (e.g., TV episodes) are denoted by Robot(x), where x represents the predefined content. If the content is not a predefined content (e.g., finance videos), then the obtained RP(x) can be obtained from the existing control system and/or can be defined by manual configuration (e.g., by an operator or administrator of the apparatus). Such a total volume of allocatable network medium data resources for the non-predefined content is denoted by Person(x), where x represents the non-predefined content. In other words, RP(x) is Robot(x) or Person(x) depending on the content x.

In the current example, the apparatus obtains allocatable network medium data resources associated with TV episodes (e.g., Robot(TV episodes)) and the number of attached clips supported by a TV episode, as well as a total volume of allocatable network medium data resources for finance videos (e.g., Person(finance videos)) and the number of attached clips supported by a finance video.

Step 1.3: calculate a real total volume of allocatable network medium data resources for the particular content, which is denoted by Real(x) where x represents the particular content. In some embodiments, the number of clips attached to a given content (e.g., a TV episode, a finance video) is manually configured by, for example, an operator or an administrator of the apparatus. In such embodiments, the real total volume of allocatable network medium data resources for that given content (e.g., Real(x)) is calculated based on the number of attached clips that can be supported by a piece of the content (obtained in Step 1.2 described above), and the proportion of allocatable network medium data resources for different attached clips (obtained in Step 1.1 described above). Specifically, Real(x) is a product of RP(x) with a ratio of allocatable network medium data resources for attached clips supported by the content over allocatable network medium data resources for all attached clips. Note that RP(x) represents an estimated total volume of allocatable network medium data resources for a particular content.

For instance, if a maximum of three clips (e.g., advertisements) can be attached to any piece of any type of content (e.g., a TV episode, a finance video) and the proportion of allocatable network medium data resources for the three attached clips is 4:3:3, and a particular content can support only the first clips, then allocatable network medium data resources for attached clips supported by this particular content is 4/10 (calculated as 4/(4+3+3)) of the total volume of allocatable network medium data resources for all attached clips. Similarly, if a particular content can support the first and second clips, then allocatable network medium data resources for attached clips supported by this particular content is 7/10 (calculated as (4+3)/(4+3+3)) of the total volume of allocatable network medium data resources for all attached clips.

Step 1.4: calculate a ratio of allocatable network medium data resources for the particular content (denoted by x) over the total volume of allocatable network medium data resources (obtained at the apparatus in 102 of the method 100). Such a ratio can be denoted by RateContent(x), which is calculated as a ratio of Real(x) over the total volume of allocatable network medium data resources. In some embodiments, such a ratio RateContent(x) represents a ratio of allocatable network medium data resources for all attached clips supported by the particular content x over the total volume of allocatable network medium data resources.

For instance, if a TV episode supports the first and second attached clips, and the proportion of allocatable network medium data resources for the three attached clips is 4:3:3, then the ratio of allocatable network medium data resources for attached clips supported by TV episodes over the total volume of allocatable network medium data resources (i.e., RateContent(TV episodes)) is calculated as a product of RP(TV episodes) with 7/10, then divided by the total volume of allocatable network medium data resources. For another instance, if a finance video supports only the first attached clips, and the proportion of allocatable network medium data resources for the three attached clips is 4:3:3, then the ratio of allocatable network medium data resources for attached clips supported by finance videos over the total volume of allocatable network medium data resources (i.e., RateContent(finance videos)) is calculated as a product of RP(finance videos) with 4/10, then divided by the total volume of allocatable network medium data resources.

Step 2: calculate a ratio of allocatable network medium data resources for requested clips associated with a particular content over the total volume of allocatable network medium data resources. Such a ratio can be calculated as a product of RateContent(x) (i.e., the ratio of allocatable network medium data resources for all attached clips supported by the particular content over the total volume of allocatable network medium data resources) with a ratio of the requested clips over all attached clips supported by the particular content.

For instance, if a TV episode supports the first and second attached clips, and only the first attached clips are requested (e.g., included in the screening condition), then the desired ratio of allocatable network medium data resources for requested clips associated with TV episodes over the total volume of allocatable network medium data resources is calculated as a product of RateContent(TV episodes) with 4/7 (calculated as 4/(4+3)). For another instance, if a finance video supports only the first attached clips, and the first attached clips are requested (e.g., included in the screening condition), then the desired ratio of allocatable network medium data resources for requested clips associated with finance videos over the total volume of allocatable network medium data resources is calculated as a product of Rate-Content(finance videos) with 1 (calculated as 4/4).

Overall, the desired ratio of allocatable network medium data resources for requested clips associated with a particular content over the total volume of allocatable network medium data resources (e.g., the ratio of allocatable network medium data resources for first clips attached to TV episodes over all allocatable network medium data resources and the ratio of allocatable network medium data resources for first clips attached to finance videos over all allocatable network medium data resources, both of which are used in calculating the first estimated allocatable resource volume described above) is calculated as: RP(x)×r/total volume of allocatable network medium data resources, where RP(x) is Robot(x) for a predefined content x or Person(x) for a non-predefined content x, and r represents a ratio of requested clips over all clips. Furthermore, note that the ratio r is a product of the two ratios used in Step 1.4 and Step 2 described above, i.e., the ratio of allocatable network medium data resources for all attached clips supported by the particular content over the total volume of allocatable network medium data resources and the ratio of the requested clips over all attached clips supported by the particular content.

Assume that a maximum of three attached clips can be supported by any piece of any type of content, and the proportion of allocatable network medium data resources for the three attached clips is 4:3:3. For instance, if a TV episode supports the first and second clips, then the ratio of allocatable network medium data resources for first clips attached to TV episodes over all allocatable network medium data resources is calculated as Robot(TV episodes)×(4/10)/total volume of allocatable network medium data resources, where 4/10 can be calculated as a product of 7/10 (calculated in Step 1.4) and 4/7 (calculated in Step 2). For another instance, if a finance video supports only the first clips, then the ratio of allocatable network medium data resources for first clips attached to finance videos over all allocatable network medium data resources is calculated as Person (finance videos)×(4/10)/total volume of allocatable network medium data resources, where 4/10 can be calculated as a product of 4/10 (calculated in Step 1.4) and 4/4 (calculated in Step 2).

Next, the second priority is to estimate a second portion of the desired allocatable network medium data resources (i.e., the second estimated allocatable resource volume) using the allocatable network medium data resources associated with predefined content(s). Specifically, according to 104, the apparatus determines that the screening condition includes TV episodes as a predefined content. The apparatus then obtains estimated allocatable network medium data resources associated with TV episodes according to 102. As described above, the apparatus can obtain the estimation from an existing control system for network medium data resources (e.g., via a data interface) or calculate the estimation based on data obtained from the existing control system.

In some embodiments, the second estimated allocatable resource volume can be calculated as a product of the estimated allocatable network medium data resources associated with TV episodes (obtained at the apparatus in 102) with a ratio associated with TV episodes (as a ratio associated with the predefined content). Since the allocatable resource volume associated with New York (as a predefined geographical region) has been calculated and included in the first estimated allocatable resource volume, the second estimated allocatable resource volume does not include any portion of allocatable resource volume associated with New York. As a result, the ratio associated with TV episodes is not associated with (e.g., calculated based on) any ratio associated with New York from the set of ratios obtained at the apparatus. Specifically, the ratio associated with TV episodes is either a ratio from the set of ratios excluding any ratio associated with New York or a ratio calculated based on other ratios from the set of ratios excluding any ratio associated with New York.

In some embodiments, for example, the ratio associated with TV episodes can be calculated as a product of a ratio of female audience from Santa Barbara over all audience with a ratio of allocatable network medium data resources for the first clips attached to TV episodes over a total volume of allocatable network medium data resources, then divided by a ratio of allocatable network medium data resources for TV episodes over the total volume of allocatable network medium data resources. Such a ratio associated with TV episodes indicates a ratio of allocatable network medium data resources for the first clips attached to TV episodes that are watched by female audience from Santa Barbara over the allocatable network medium data resources for TV episodes. In some embodiments, the allocatable network medium data resources for TV episodes represent the allocatable network medium data resources for all attached clips supported by TV episodes.

In some embodiments, the ratio of female audience from Santa Barbara over all audience can be obtained from existing data. The ratio of allocatable network medium data resources for the first clips attached to TV episodes over the total volume of allocatable network medium data resources can be calculated according to Step 2 as described above. The ratio of allocatable network medium data resources for TV episodes over the total volume of allocatable network medium data resources can be calculated according to Step 1 (including Steps 1.1-1.4) as described above.

Third, the third priority is to estimate the remaining portion of the desired allocatable network medium data resources (i.e., the third estimated allocatable resource volume) using the total volume of allocatable network medium data resources and other ratios from the set of ratios. Specifically, according to 105, the apparatus calculates the third estimated allocatable resource volume based on the total volume of allocatable network medium data resources and the set of ratios excluding any ratio associated with New York (e.g., used in calculating the first estimated allocatable resource volume) and any ratio associated with TV episodes (e.g., used in calculating the second estimated allocatable resource volume).

In some embodiments, the third estimated allocatable resource volume can be calculated as a product of the total volume of allocatable network medium data resources (obtained at the apparatus in 102) with an associated ratio. Since the allocatable resource volume associated with New York (as a predefined geographical region) and the allocatable resource volume associated with TV episodes (as a predefined content) have been calculated and included in the first estimated allocatable resource volume and the second estimated allocatable resource volume, respectively, the third estimated allocatable resource volume does not include any portion of allocatable resource volume associated with New York or TV episodes.

As a result, the associated ratio used in calculating the third estimated allocatable resource volume is not associated with (e.g., calculated based on) any ratio associated with New York or any ratio associated with TV episodes from the set of ratios obtained at the apparatus. Specifically, the associated ratio is either a ratio from the set of ratios excluding any ratio associated with New York and any ratio associated with TV episodes or a ratio calculated based on other ratios from the set of ratios excluding any ratio associated with New York and any ratio associated with TV episodes. As such, the third estimated allocatable resource volume represents allocatable network medium data resources for the first clips attached to finance videos that are watched by female audience from Santa Barbara.

In some embodiments, for example, the ratio used in calculating the third estimated allocatable resource volume can be calculated as a product of a ratio of female audience from Santa Barbara over all audience with a ratio of allocatable network medium data resources for the first clips attached to finance videos over the total volume of allocatable network medium data resources. In some embodiments, the ratio of female audience from Santa Barbara over all audience can be obtained from existing data. Similar to the ratio of allocatable network medium data resources for the first clips attached to TV episodes over the total volume of allocatable network medium data resources, the ratio of allocatable network medium data resources for the first clips attached to finance videos over the total volume of allocatable network medium data resources can be calculated according to Step 2 as described above.

Last, according to 106, the apparatus adds up the first, second, and third estimated allocatable resource volumes, and the resulted sum is the requested estimated allocatable resource volume of the network medium data resources for the screening condition.

In some embodiments, the screening condition received at an apparatus includes a display position identifier and a frequency of being displayed at the display position. A display position can be, for example, a first clip, a second clip, or a third clip attached to a piece of content (e.g., a TV episode, a finance video). A frequency of being displayed at a display position measures the number of certain network medium data (e.g., an advertisement, a video clip) being displayed at that display position during a predefined time period such as, for example, three times a week, twice per day, or the like.

If such a frequency is included in the screening condition, then the desired estimated allocatable resource volume of network medium data resources for the screening condition can be calculated as a product of the sum of the three estimated allocatable resource volumes (obtained in 106 of the method 100) with a frequency-ratio that is associated with the frequency. Specifically, the frequency-ratio associated with a frequency included in a screening condition can be calculated as follows.

The apparatus can obtain, from an existing control system of the network medium data resources (e.g., via a data interface), a frequency-ratio matrix associated with the frequency. One dimension (e.g., a horizontal axis) of such a frequency-ratio matrix represents numbers of being displayed, and the other dimension (e.g., a vertical axis) of the frequency-ratio matrix represents different predefined time periods. For example, a frequency-ratio matrix has a dimension representing numbers of being displayed that range from 1 to 1000, and the other dimension representing predefined time periods that range from 1 day to 93 days. An element included in the frequency-ratio matrix corresponding to z times being displayed and y days represents a ratio of audience who watch the content (e.g., an advertisement, a video clip) z times per y days over all audience.

In some embodiments, a frequency-ratio associated with a piece of content (e.g., an advertisement) being displayed at a display position that is included in a screening condition can be calculated based on elements from the frequency-ratio matrix in a cumulative manner. For example, a frequency-ratio of 3 times per week represents a ratio of audience who watch the piece of content at most 3 times per week over all audience. The audience who watch the piece of content at most 3 times per week includes audience who watch the piece of content once per week, twice per week, and 3 times per week. Furthermore, for audience who watch the piece of content 4 times per week, 3 out of the 4 times can be used to watch this piece of content. Thus, the audience who watch the piece of content at most 3 times per week also includes 3/4 of the audience who watch the piece of content 4 times per week.

Therefore, assume R(z,y) represents a frequency-ratio of z times per y days, then R(z,y) can be calculated as:

$$R(z, y) = \sum_{z1 \leq z} F(z1, y) + \sum_{z2 > z} F((z2, y) * z/z2,$$

where F(z,y) represents the element in the frequency-ratio matrix corresponding to z times and y days. For example, with the frequency-ratio matrix having a dimension representing numbers of being displayed that range from 1 to 1000 and the other dimension representing predefined time periods that range from 1 day to 93 days, a frequency-ratio of 10 times per 10 days is calculated using the above formula (z=10, y=10), where F(z1,10) is accumulated for $1 \leq z1 \leq 10$ and F(z2,10)*10/z2 is accumulated for $11 \leq z2 \leq 1000$.

In some embodiments, as shown in FIG. 2, a screening condition can include a duration of attached content (i.e., "Duration of attached content") and content of the network medium data resources (i.e., "Content"). In such embodiments, although not shown in FIG. 1, a method for estimating allocatable network medium data resources can further include operations of the following Steps 3.1 to 3.5.

Step 3.1: obtain, from existing data (e.g., data obtained from an existing control system of network medium data resources), all durations of attached contents that are supported by the collection of all contents. In other words, each duration of attached content obtained at Step 3.1 is supported by at least one piece of content.

Step 3.2: identify all the content (e.g., all pieces of different types of contents) that can support the duration of attached content included in the screening condition (e.g., 15 seconds as shown in FIG. 2). That is, for each identified content (or each piece of identified content), at least one duration of attached content supported by that identified content (or piece of identified content) is equal to or longer than the duration of attached content included in the screening condition.

Step 3.3: calculate a real volume of allocatable network medium data resources for the identified content. Such a real volume can be calculated using a method similar to the method of calculating Real(x) as described above with respect to Step 1.3.

Step 3.4: calculate a ratio of allocatable network medium data resources for identified content over a total volume of allocatable network medium data resources for all content, which is denoted by w. Such a ratio w can be calculated as a ratio of the real volume calculated at Step 3.3 over the total volume of allocatable network medium data resources obtained in 102 of the method 100.

Step 3.5: calculate the final estimated allocatable resource volume of network medium data resources for the screening condition by multiplying the desired estimated allocatable resource volume of network medium data resources for the screening condition (calculated based on the sum of the three estimated allocatable resource volumes and the frequency-ratio, as described above) with the ratio w calculated at Step 3.4.

For example, a screening condition includes Los Angeles and 30 seconds as duration of attached content. The final estimated allocatable resource volume of network medium data resources for the screening condition is a production of a total volume of allocatable network medium data resources associated with Los Angeles with a ratio of allocatable network medium data resources for content supporting attachments with duration of 30 seconds over allocatable network medium data resources for all content. The ratio is calculated as a ratio of a real volume (e.g., Real(x)) of allocatable network medium data resources for all content that can support attachments with duration of 30 seconds over a real volume of allocatable network medium data resources for all content.

In some embodiments, due to various losses in allocating network medium data resources, an attachment of a network medium content with duration of 60 seconds can be used to play two attached clips each having duration of 30 seconds, or alternatively, to play three attached clips each having duration of 15 seconds. In such embodiments, the ratio w calculated at Step 3.4 (i.e., the ratio of allocatable network medium data resources for identified content over a total volume of allocatable network medium data resources for all content) associated with certain duration of attached content can be further discounted based on monitoring data of the actual operations. For example, the ratio w associated with duration of 30 seconds is discounted by multiplying with 50%. For another example, the ratio w associated with duration of 60 seconds is discounted by multiplying with 30%.

In some embodiments, in actual operations, more network medium data resources than requested can be allocated to account for errors associated with statistics and/or third-party monitoring, thus reducing the total volume of allocatable network medium data resources. That is, a video clip (e.g., an advertisement) is played more than required or designed. In such embodiments, to take the extra allocated network medium data resources into account, the final estimated allocatable resource volume of network medium data resources for the screening condition can be additionally discounted by a coefficient before the result is provided to the user. Such a discount coefficient for extra display can be, for example, 93%, which indicates that 7% of the allocatable resource volume is used to cover the extra display of content (e.g., extra play of video clips). Such a discount coefficient can be adaptively modified within the range of 0 to 1 based on monitoring data (e.g., reduction or increase of errors).

In some embodiments, due to a higher priority given to core regions (e.g., predefined geographical regions) such as New York, Los Angeles, Chicago, etc., in estimating allocatable network medium data resources, a certain amount of allocatable network medium data resources can be reserved for those core regions. In such embodiments, to account for the reservation for the core regions, the final estimated allocatable resource volume of network medium data resources for the screening condition can be additionally discounted by a coefficient before the result is provided to the user. Such a discount coefficient for reservation can be within the range of 0 to 1, for example, 95%.

In some embodiments, as described above, the estimated allocatable network medium data resources, as a result provided to the user, can be a product of the sum of the first, second, third estimated allocatable resource volumes (calculated at 106 of the method 100) with any combination of a frequency-ratio R(z,y) (based on a frequency included in the screening condition), a ratio w associated with a certain duration of attached content (e.g., included in the screening condition), a discount coefficient for extra display, and/or a discount coefficient for reservation for core regions. For example, the result provided to the user can be a product of 1) the sum of the three estimated allocatable resource volumes, 2) the frequency-ratio R(z,y), 3) the ratio w, 4) the discount coefficient for extra display, and 5) the discount coefficient for reservation for core regions.

In some embodiments, the apparatus performing the method 100 can be configured to calculate a conflict resource volume of network medium data resources associated with multiple screening conditions. Such a conflict resource volume is associated with any (potential) conflict between a screening condition in query and one or more other screening conditions included in one or more application requests stored at the apparatus. Each stored application request can be an actual application request or a virtual application request. In some embodiments, a conflict exists if and only if at least a portion (e.g., a dimension) of the screening condition in query overlaps with at least a portion (e.g., a dimension) of the screening condition(s) included in the stored application requests.

For example, a screening condition in query includes New York and male; a screening condition included in a first stored application request includes New York and age of 18-25, and has a requested volume of 100 CPM; and another screening condition included in a second stored application request includes Los Angeles and male, and has a requested volume of 200 CPM. Thus, the screening condition in query and the screening condition included in the first stored application request have an overlapped portion of male audience from New York with an age between 18 and 25. Therefore, the ratio p of the overlapped portion over the requested volume of the first application request (100 CPM) can be calculated as the ratio of male audience from New York with an age between 18 and 25 over all audience from New York with an age between 18 and 25. The conflict resource volume can then be calculated as a product of the requested volume of the first application request (100 CPM) with the ratio p. Additionally, since male audience from New York has no overlap with male audience from Los Angeles, the screening condition in query and the screening condition included in the second stored application request has no overlap, thus resulting in no conflict resource volume. Finally, a total conflict resource volume can be calculated as a sum of all conflict resource volumes associated with the (potential) conflict(s) between the screening condition in query and the screening conditions included in all the stored application requests.

Figure 3:
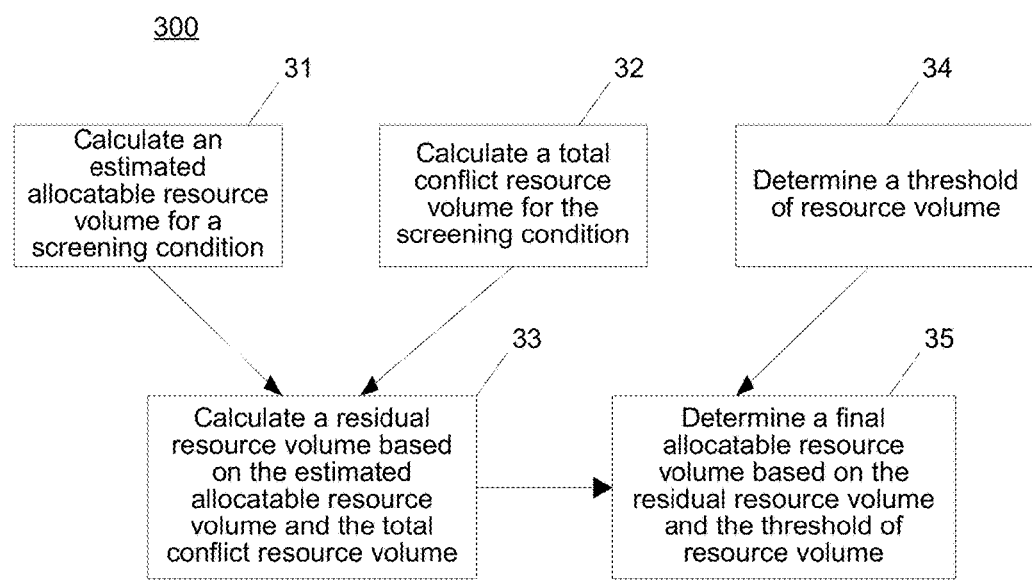
FIG. 3 is a flow chart illustrating a method performed at an apparatus for calculating allocatable network medium data resources in accordance with some embodiments.

FIG. 3 is a flow chart illustrating a method 300 performed at an apparatus for calculating allocatable network medium data resources in accordance with some embodiments. Particularly, the method 300 can be used to estimate allocatable network medium data resources based on conflict resource volumes between a screening condition in query and screening condition(s) included in stored application request(s) (including actual application request(s) and/or virtual application request(s)). The apparatus performing the method 300 can be similar to the apparatus performing the method 100 as described with respect to FIG. 1. Details of such an apparatus are shown and described below with respect to FIGS. 5-6.

In some embodiments, the apparatus performing the method 300 can include one or more processors and memory. In such embodiments, the method 300 is governed by instructions or code of an application that are stored in a non-transitory computer readable storage medium of the apparatus and executed by the one or more processors of the apparatus. The application is associated with estimating allocatable network medium data resources. As a result of the application being executed at the one or more processors of the apparatus, the method 300 is performed at the apparatus. As shown in FIG. 3, the method 300 includes the following steps.

At 31, the apparatus calculates an estimated allocatable resource volume for the screening condition in query. Such an estimated allocatable resource volume can be denoted by M, and can be calculated using the method 100 shown and described above with respect to FIG. 1.

At 32, the apparatus calculates a total conflict resource volume (denoted by V) for the screening condition. Specifically, the apparatus calculates the total conflict resource volume caused by (potential) conflicts between the screening condition in query and screening condition(s) included in application request(s) stored at the apparatus. Such a total conflict resource volume can be calculated in Steps 321-325 as follows.

Step 321: identify each screening condition included in the stored application request(s) that is (potentially) in conflict with the screening condition in query, and determine each dimension in conflict from the identified screening condition(s).

Step 322: obtain a requested volume Q (e.g., 100 CPM in the above example) of each application request that is in conflict with the screening condition in query.

Step 323: calculate a ratio p for each application request that is in conflict with the screening condition in query, where the ratio p is a ratio of the overlapped portion between the screening condition in query and the application request over the requested volume Q of the application request.

Step 324: calculate Q×p for each application request that is in conflict with the screening condition in query, which is the conflict resource volume caused by the overlap between the screening condition in query and that application request.

Step 325: add up all conflict resource volumes (Q×p) calculated for each application request that is in conflict with the screening condition in query, which results in the total conflict resource volume V.

In some embodiments, a potential conflict in theory does not necessarily cause actual conflict in allocatable resources. For example, a screening condition in query includes male, and a stored application request (e.g., an actual application request or a virtual application request) includes New York. In theory, an overlap at male audience from New York can cause a conflict between the screening condition and the application request. However, from a practical perspective, a user querying the screening condition including male does not care whether New York has sufficient allocatable network medium resources as long as her requested volume can be satisfied by male audience from other regions.

In such embodiments, a hierarchical resource allocation approach can be implemented in allocating network medium data resources to substantially eliminate such "false" conflicts in calculation. Specifically, network medium data resources allocated according to a request (e.g., a screening condition, a stored application request) are categorized into three priority levels: the first priority level for network medium data resources allocated to a request including a core region (e.g., a predefined geographical region such as New York, Los Angeles, Chicago, etc.); the second priority level for network medium data resources allocated to a request including at least another dimension excluding any core region; and the third priority level for network medium data resources allocated to a request including no particular dimension (e.g., a screening condition or an application request that does not include any particular dimension). In some embodiments, a request associated with all audience (e.g., network medium data resources allocated to all audience from all regions and associated with all content) is considered as a request including no particular dimension.

In some embodiments, with such a hierarchical resource allocation approach, network medium data resource allocated to each priority level does not conflict with network medium data resource allocated to each other priority level. In some other embodiments, with such a hierarchical resource allocation approach, a theoretic conflict between a screening condition in query and an application request is not taken account into the calculation of conflict resource volume if that theoretic conflict is caused by 1) a request of the first priority level included in the application request and a request of the second or third priority level included in the screening condition in query; or 2) a request of the second priority level included in the application request and a request of the third priority level included in the screening condition in query. In yet some other embodiments, with such a hierarchical resource allocation approach, a theoretic conflict between a screening condition in query and an application request is not taken account into the calculation of conflict resource volume if that theoretic conflict is caused by 1) a request of the first priority level included in the screening condition in query and a request of the second or third priority level included in the application request; or 2) a request of the second priority level included in the screening condition in query and a request of the third priority level included in the application request.

Figure 4:
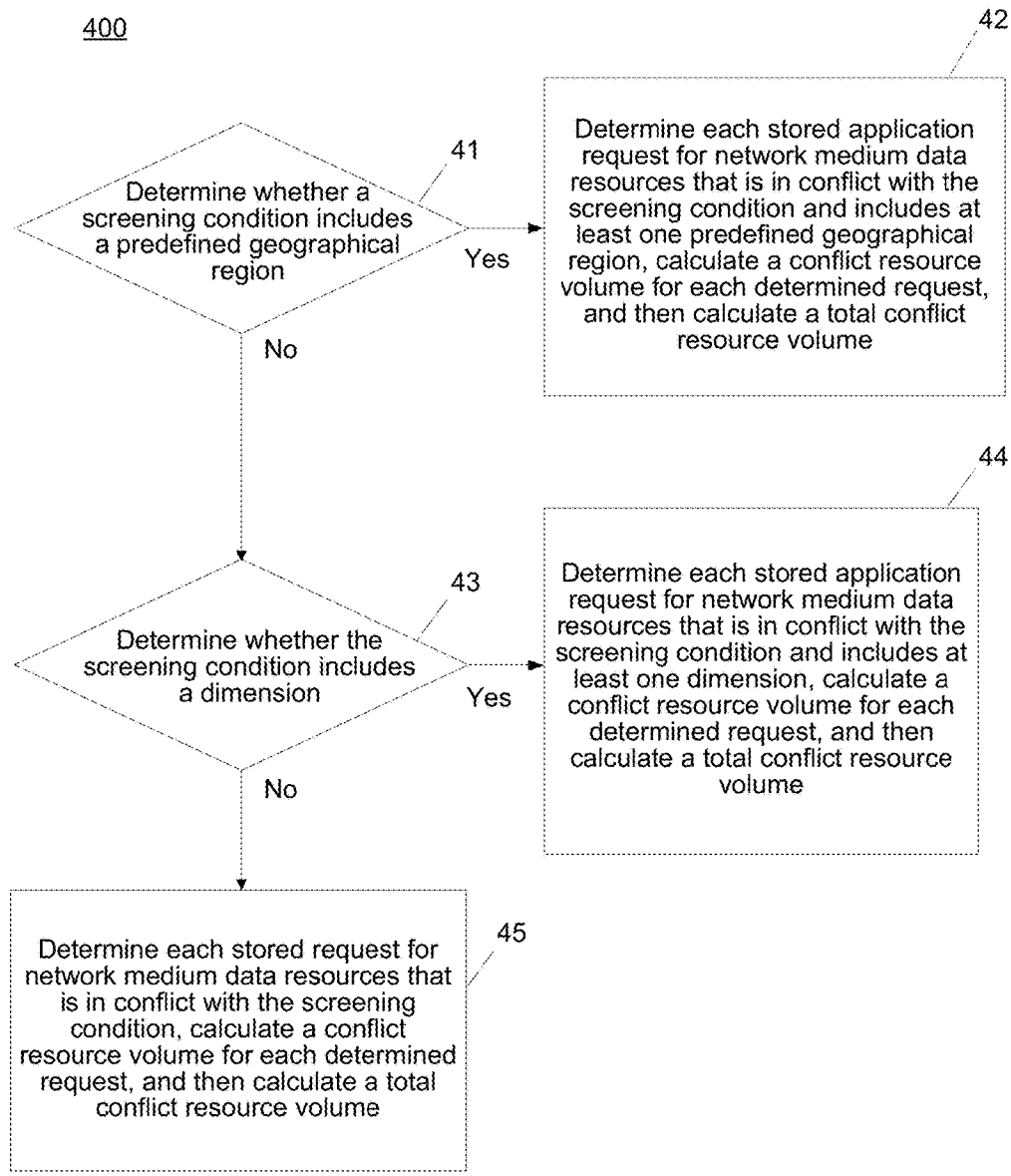
FIG. 4 is a flow chart illustrating a method performed at an apparatus for calculating conflict resource volume associated with performing the method in FIG. 3.

FIG. 4 is a flow chart illustrating a method 400 performed at an apparatus for calculating conflict resource volume associated with performing the method 300 in FIG. 3. Particularly, the method 400 can be used to calculate the total conflict resource volume for the screening condition (denoted by V) at 32 of the method 300. As such, the method 400 can represent one embodiment of operations performed at 32 of the method 300. The apparatus performing the method 400 can be similar to the apparatus performing the method 100 as described with respect to FIG. 1. Details of such an apparatus are shown and described below with respect to FIGS. 5-6.

In some embodiments, the apparatus performing the method 400 can include one or more processors and memory. In such embodiments, the method 400 is governed by instructions or code of an application that are stored in a non-transitory computer readable storage medium of the apparatus and executed by the one or more processors of the apparatus. The application is associated with calculating conflict resource volume. As a result of the application being executed at the one or more processors of the apparatus, the method 400 is performed at the apparatus. As shown in FIG. 4, the method 400 includes the following steps.

At 41, corresponding to the first priority level of the hierarchical resource allocation approach described above, the apparatus determines whether a screening condition in query includes a predefined geographical region (e.g., a core region). If the apparatus determines that the screening condition includes a predefined geographical region, then the process moves to 42. Otherwise, if the apparatus determines that the screening condition does not include any predefined geographical region, then the process moves to 43.

At 42, the apparatus determines each stored application request for network medium data resources that is in conflict with the screening condition and includes at least one predefined geographical region. In other words, the apparatus searches through all application requests associated with the first priority level. The apparatus then calculates a conflict resource volume for each determined stored application request, and finally calculates a total conflict resource volume by adding up all the calculated conflict resource volumes. In some embodiments, the apparatus can calculate the total conflict resource volume using the method described above with respect to Steps 321-325.

At 43, corresponding to the second priority level of the hierarchical resource allocation approach described above, the apparatus determines whether a screening condition in query includes a dimension (excluding the predefined geographical region). If the apparatus determines that the screening condition includes such a dimension, then the process moves to 44. Otherwise, if the apparatus determines that the screening condition does not include such a dimension, then the process moves to 45.

At 44, the apparatus determines each stored application request for network medium data resources that is in conflict with the screening condition and includes at least one dimension. In other words, the apparatus searches through all application requests associated with the first priority level or the second priority level. The apparatus then calculates a conflict resource volume for each determined stored application request, and finally calculates a total conflict resource volume by adding up all the calculated conflict resource volumes. In some embodiments, the apparatus can calculate the total conflict resource volume using the method described above with respect to Steps 321-325.

At 45, corresponding to the third priority level of the hierarchical resource allocation approach described above, the apparatus determines each stored request for network medium data resources that is in conflict with the screening condition. In other words, the apparatus searches through all application requests associated with the first priority level, the second priority level, or the third priority level (that is, all application requests). The apparatus then calculates a conflict resource volume for each determined request, and finally calculates a total conflict resource volume by adding up all the calculated conflict resource volumes. In some embodiments, the apparatus can calculate the total conflict resource volume using the method described above with respect to Steps 321-325.

Returning to FIG. 3, at 33, the apparatus calculates a residual resource volume (denoted by S) based on the estimated allocatable resource volume (M) and the total conflict resource volume (V). Specifically, S can be the difference between M and V (i.e., $S=M-V$).

In some embodiments, a control system of network medium data resources imposes a restriction on allocatable network medium data resources. Such a restriction can be, for example, a threshold of resource volume that is an upper limit for a total volume of the allocatable network medium data resources. For example, the control system specifies that the same clip cannot be played at more than one position attached to any given piece of network medium content. That is, among the three clips attached to a piece of content (e.g., a TV episode, a video clip), the same clip can be played at most once. As a result, the final allocatable resource volume is calculated based on the residual resource volume calculated at 33 and the restriction (e.g., a threshold of resource volume).

Thus, at 34, the apparatus determines a threshold of resource volume. At 35, the apparatus determines a final allocatable resource volume based on the residual resource volume (S) and the threshold of resource volume. In some embodiments, for example, the final allocatable resource volume calculated at 35 is the minimum of the residual resource volume (S) calculated at 33 and the threshold of resource volume determined at 34.

Figure 5:
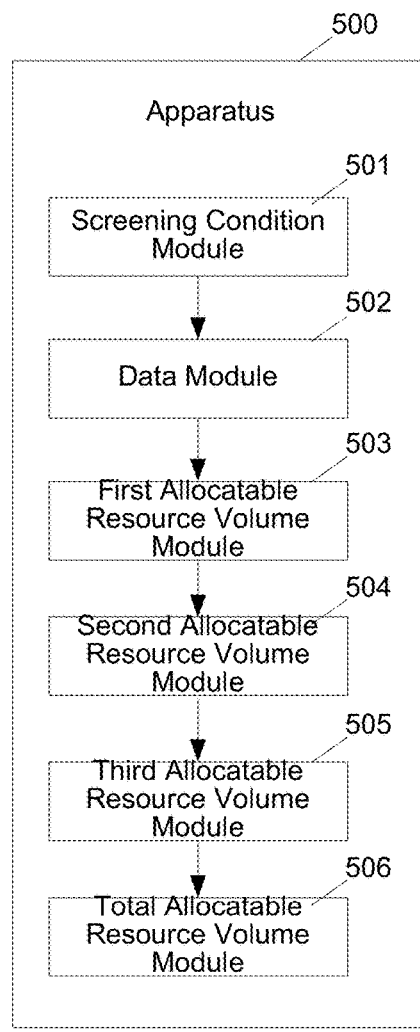
FIG. 5 is a block diagram illustrating modules of an apparatus configured to estimate allocatable network medium data resources in accordance with some embodiments.

FIG. 5 is a block diagram illustrating modules of an apparatus 500 configured to estimate allocatable network medium data resources in accordance with some embodiments. The apparatus 500 can be structurally and functionally similar to the apparatuses performing the methods 100, 300 and 400 described above with respect to FIGS. 1-4. As shown in FIG. 5, the apparatus 500 includes a screening condition module 501, a data module 502, a first allocatable resource volume module 503, a second allocatable resource volume 504, a third allocatable resource volume module 505, and a total allocatable resource volume module 506. In some embodiments, an apparatus can include more or less modules than those shown in FIG. 5.

In some embodiments, each module included in the apparatus 500 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the apparatus 500 (not shown in FIG. 5) and executed at a processor (e.g., a CPU) of the apparatus 500 (not shown in FIG. 5). Overall, the screening condition module 501, the data module 502, the first allocatable resource volume module 503, the second allocatable resource volume 504, the third allocatable resource volume module 505 and the total allocatable resource volume module 506 can be configured to collectively perform at least a portion of the methods 100, 300 and 400 shown and described above with respect to FIGS. 1-4. In other words, the screening condition module 501, the data module 502, the first allocatable resource volume module 503, the second allocatable resource volume 504, the third allocatable resource volume module 505 and the total allocatable resource volume module 506 can be configured to collectively estimate allocatable network medium data resources.

Specifically, the screening condition module 501 is configured to, among other functions, receive and/or process screening conditions of network medium data resources. Such a screening condition typically includes at least one dimension from a set of dimensions of the network medium data resources. In some embodiments, the screening condition module 501 is configured to perform operations of 101 in the method 100 shown and described with respect to FIG. 1.

The data module 502 is configured to, among other functions, obtain allocation data of the network medium data resources based on existing data (e.g., received from an existing control system of network medium data resources). Such allocation data typically includes, for example, allocatable network medium data resources within a predefined geographical region, allocatable network medium data resources associated with a predefined content, a total volume of the allocatable network medium data resources, a set of ratios associated with the set of dimensions of the network medium data resources, and/or the like. In some embodiments, the data module 502 is configured to perform operations of 102 in the method 100 shown and described with respect to FIG. 1.

The first allocatable resource volume module 503 is configured to, among other functions, determine whether a received screening condition includes a predefined geographical region, and calculate a first estimated allocatable resource volume associated with the predefined geographical region. The first allocatable resource volume module 503 can be configured to calculate the first estimated allocatable resource volume using the allocatable network medium data resources within the predefined geographical region and a ratio associated with the predefined geographical region. In some embodiments, the first allocatable resource volume module 503 is configured to perform operations of 103 and the subsequent calculation of the first estimated allocatable resource volume in the method 100 shown and described with respect to FIG. 1.

The second allocatable resource volume 504 is configured to, among other functions, determine whether a received screening condition includes a predefined content, and calculate a second estimated allocatable resource volume associated with the predefined content. The second allocatable resource volume 504 can be configured to calculate the second estimated allocatable resource volume using the allocatable network medium data resources associated with the predefined content and a ratio associated with the predefined content. In some embodiments, the second allocatable resource volume 504 is configured to perform operations of 104 and the subsequent calculation of the second estimated allocatable resource volume in the method 100 shown and described with respect to FIG. 1.

The third allocatable resource volume module 505 is configured to, among other functions, calculate a third estimated allocatable resource volume based on the total volume of the allocatable network medium data resources and the set of ratios excluding the ratio associated with the predefined geographical region and the ratio associated with the predefined content. In some embodiments, the third allocatable resource volume module 505 is configured to perform operations of 105 in the method 100 shown and described with respect to FIG. 1.

The total allocatable resource volume module 506 is configured to, among other functions, add up the first, second, and third estimated allocatable resource volumes calculated by the first allocatable resource volume module 503, the second allocatable resource volume module 504, and the third allocatable resource volume module 505, respectively. The result is an estimated allocatable resource volume of the network medium data resources for the screening condition. In some embodiments, the total allocatable resource volume module 506 is configured to perform operations of 106 in the method 100 shown and described with respect to FIG. 1.

Furthermore, in some embodiments, the modules of the apparatus 500 can be configured to perform (individually or collectively) operations of Steps 1 and 2 (including Steps 1.1-1.4) and operations of Steps 3.1-3.5. The modules can also be configured to calculate or determine RP(x), a frequency-ratio R(z,y), a ratio w, a discount coefficient for extra display, a discount coefficient for reservation for core regions, and other parameters as described above. In such embodiments, one or more sub-modules (not shown in FIG. 5) of the modules included in the apparatus 500 can be configured to perform those operations and/or calculate those parameters.

Figure 6:
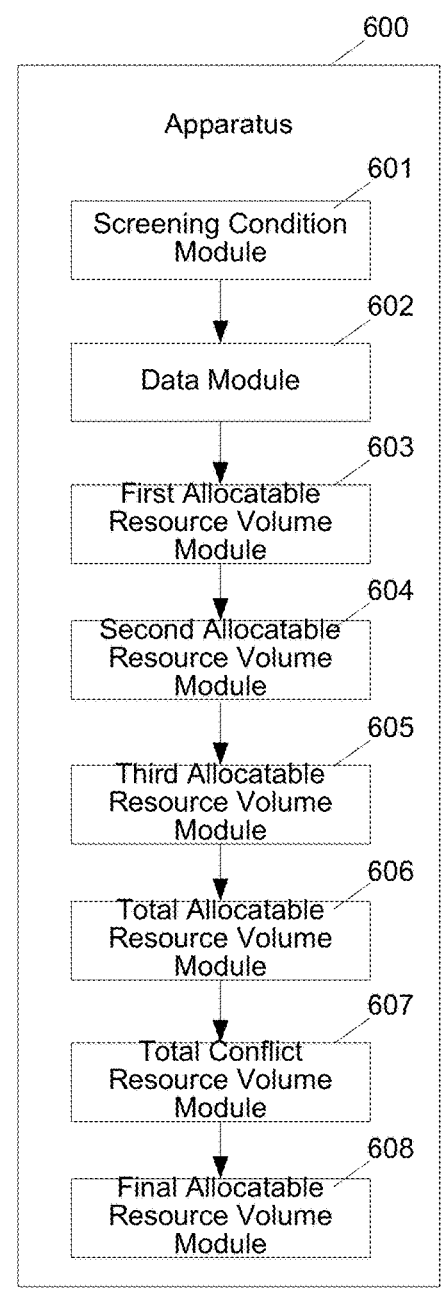
FIG. 6 is a block diagram illustrating modules of another apparatus configured to estimate allocatable network medium data resources in accordance with some embodiments.

FIG. 6 is a block diagram illustrating modules of an apparatus 600 configured to estimate allocatable network medium data resources in accordance with some embodiments. The apparatus 600 can be structurally and functionally similar to the apparatuses performing the methods 100, 300 and 400 described above with respect to FIGS. 1-4, as well as the apparatus 500 shown and described above with respect to FIG. 5. As shown in FIG. 6, the apparatus 600 includes a screening condition module 601, a data module 602, a first allocatable resource volume module 603, a second allocatable resource volume 604, a third allocatable resource volume module 605, a total allocatable resource volume module 606, a total conflict resource volume module 607 and an final allocatable resource volume module 608. In some embodiments, an apparatus can include more or less modules than those shown in FIG. 6.

Similar to the apparatus 500 in FIG. 5, each module included in the apparatus 600 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the apparatus 600 (not shown in FIG. 6) and executed at a processor (e.g., a CPU) of the apparatus 600 (not shown in FIG. 6). Overall, the screening condition module 601, the data module 602, the first allocatable resource volume module 603, the second allocatable resource volume 604, the third allocatable resource volume module 605, the total allocatable resource volume module 606, the total conflict resource volume module 607 and the final allocatable resource volume module 608 can be configured to collectively perform at least a portion of the methods 100, 300 and 400 shown and described above with respect to FIGS. 1-4. In other words, the screening condition module 601, the data module 602, the first allocatable resource volume module 603, the second allocatable resource volume 604, the third allocatable resource volume module 605, the total allocatable resource volume module 606, the total conflict resource volume module 607 and the final allocatable resource volume module 608 can be configured to collectively estimate allocatable network medium data resources.

Specifically, the screening condition module 601 is structurally and functionally similar to the screening condition module 501 of the apparatus 500; the data module 602 is structurally and functionally similar to the data module 502 of the apparatus 500; the first allocatable resource volume module 603 is structurally and functionally similar to the first allocatable resource volume module 503 of the apparatus 500; the second allocatable resource volume 604 is structurally and functionally similar to the second allocatable resource volume 504 of the apparatus 500; the third allocatable resource volume module 605 is structurally and functionally similar to the third allocatable resource volume module 505 of the apparatus 500; and the total allocatable resource volume module 606 is structurally and functionally similar to the total allocatable resource volume module 506 of the apparatus 500. Overall, the screening condition module 601, the data module 602, the first allocatable resource volume module 603, the second allocatable resource volume 604, the third allocatable resource volume module 605 and the total allocatable resource volume module 606 are configured to collectively perform operations of 31 in the method 300 shown and described with respect to FIG. 3.

Furthermore, the total conflict resource volume module 607 is configured to, among other functions, calculate a total conflict resource volume for a received screening condition. Specifically, the total conflict resource volume module 607 is configured to perform operations of 32 in the method 300 (including Steps 321-325) shown and described with respect to FIG. 3, as well as operations of the method 400 shown and described with respect to FIG. 4.

Similarly, the final allocatable resource volume module 608 is configured to, among other functions, determine a final allocatable resource volume. Specifically, in some embodiments, the final allocatable resource volume module 608 is configured to perform operations of 33, 34 and 35 in the method 300 shown and described with respect to FIG. 3. In such embodiments, the final allocatable resource volume module 608 is configured to determine the final allocatable resource volume based on the estimated allocatable resource volume calculated by the total allocatable resource volume module 606 and the total conflict resource volume for the received screening condition calculated by the total conflict resource volume module 607.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for estimating allocatable network medium data resources, comprising:

at an apparatus having one or more processors and memory for storing programs to be executed by the one or more processors:

receiving, from a first user, an application request for network medium data resources, the application request including a first screening condition of network medium data resources, the first screening condition including at least two screening dimensions from a set of screening dimensions of the network medium data resources;

after receiving the first screening condition:

receiving, from a second user, a user query for network medium data resources, the user query including a second screening condition of the network medium data resources, the second screening condition including at least two screening dimensions from the set of screening dimensions, wherein one or more of the at least two screening dimensions of the second screening condition overlap with one or more of the at least two screening dimensions of the first screening condition;

obtaining allocation data of the network medium data resources, the allocation data including at least allocatable network medium data resources within a predefined geographical region, allocatable network medium data resources associated with a predefined content, a total volume of the allocatable network medium data resources, and a set of ratios associated with the set of screening dimensions of the network medium data resources;

calculating an estimated allocatable resource volume of the network medium data resources for the second screening condition using the obtained allocation data of the network medium data resources;

calculating a conflict metric of the network medium data resources corresponding to the overlap between the first screening condition and the second screening condition, further including:

determining that the user query can be satisfied by network medium data resources other than the overlapped network medium data resources between the first screening condition and the second screening condition; and removing the overlapped network medium data resources between the first screening condition and the second screening condition from the calculation of the conflict metric;

calculating a residual resource volume of the network medium data resources based on the conflict metric and the estimated allocatable resource volume for the second screening condition; and determining an allocatable resource volume of the network medium data resources for the second screening condition based on the residual resource volume and returning, to the second user, information of the determined allocatable resource volume of the network medium data resources for the second screening condition.

2. The method of claim 1, wherein calculating the estimated allocatable resource volume of the network medium data resources for the second screening condition using the obtained allocation data of the network medium data resources includes:

in accordance with the second screening condition including the predefined geographical region, calculating a first estimated allocatable resource volume using the allocatable network medium data resources within the predefined geographical region and a ratio associated with the predefined geographical region;

in accordance with the second screening condition including the predefined content, calculating a second estimated allocatable resource volume using the allocatable network medium data resources associated with the predefined content and a ratio associated with the predefined content;

calculating a third estimated allocatable resource volume based on the total volume of the allocatable network medium data resources and the set of ratios excluding the ratio associated with the predefined geographical region and the ratio associated with the predefined content; and adding up the first, second, and third estimated allocatable resource volumes as the estimated allocatable resource volume of the network medium data resources for the second screening condition.

3. The method of claim 1, wherein the at least two or more screening dimensions of the network medium data resources included in the first and second screening conditions are two or more of: a display position of the network medium data resources, gender of audience, age of audience, region of audience, time of display, scene of display, content of the network medium data resources, frequency of display, and duration of an attached content.

4. The method of claim 1, wherein the allocatable resource volume is equal to the residual resource volume.

5. The method of claim 1, wherein the allocatable resource volume is the lower of the residual resource volume and a predefined threshold of resource volume.

6. The method of claim 1, wherein the residual resource volume is calculated by subtracting the conflict resource volume from the estimated allocatable resource volume for the second screening condition.

7. An apparatus, comprising:
one or more processors; and
memory storing one or more programs to be executed by the one or more processors, the one or more programs comprising instructions for:

receiving, from a first user, an application request for network medium data resources, the application request including a first screening condition of network medium data resources, the first screening condition including at least two screening dimensions from a set of screening dimensions of the network medium data resources;

after receiving the first screening condition:

receiving, from a second user, a user query for network medium data resources, the user query including a second screening condition of the network medium data resources, the second screening condition including at least two screening dimensions from the set of screening dimensions, wherein one or more of the at least two screening dimensions of the second screening condition overlap with one or more of the at least two screening dimensions of the first screening condition;

obtaining allocation data of the network medium data resources, the allocation data including at least allocatable network medium data resources within a predefined geographical region, allocatable network medium data resources associated with a predefined content, a total volume of the allocatable network medium data resources, and a set of ratios associated with the set of screening dimensions of the network medium data resources;

calculating an estimated allocatable resource volume of the network medium data resources for the second screening condition using the obtained allocation data of the network medium data resources;

calculating a conflict metric of the network medium data resources corresponding to the overlap between the first screening condition and the second screening condition, further including:

determining that the user query can be satisfied by network medium data resources other than the overlapped network medium data resources between the first screening condition and the second screening condition; and removing the overlapped network medium data resources between the first screening condition and the second screening condition from the calculation of the conflict metric;

calculating a residual resource volume of the network medium data resources based on the conflict metric and the estimated allocatable resource volume for the second screening condition; and determining an allocatable resource volume of the network medium data resources for the second screening condition based on the residual resource volume and returning, to the second user, information of the determined allocatable resource volume of the network medium data resources for the second screening condition.

8. The apparatus of claim 7, wherein calculating the estimated allocatable resource volume of the network medium data resources for the second screening condition using the obtained allocation data of the network medium data resources includes:
in accordance with the second screening condition including the predefined geographical region, calculating a first estimated allocatable resource volume using the allocatable network medium data resources within the predefined geographical region and a ratio associated with the predefined geographical region;
in accordance with the second screening condition including the predefined content, calculating a second estimated allocatable resource volume using the allocatable network medium data resources associated with the predefined content and a ratio associated with the predefined content;
calculating a third estimated allocatable resource volume based on the total volume of the allocatable network medium data resources and the set of ratios excluding the ratio associated with the predefined geographical region and the ratio associated with the predefined content; and
adding up the first, second, and third estimated allocatable resource volumes as the estimated allocatable resource volume of the network medium data resources for the second screening condition.

9. The apparatus of claim 7, wherein the at least two or more screening dimensions of the network medium data resources included in the first and second screening conditions are two or more of: a display position of the network medium data resources, gender of audience, age of audience, region of audience, time of display, scene of display, content of the network medium data resources, frequency of display, and duration of an attached content.

10. The apparatus of claim 7, wherein the allocatable resource volume is equal to the residual resource volume.

11. The apparatus of claim 7, wherein the allocatable resource volume is the lower of the residual resource volume and a predefined threshold of resource volume.

12. The apparatus of claim 7, wherein the residual resource volume is calculated by subtracting the conflict resource volume from the estimated allocatable resource volume for the second screening condition.

13. A non-transitory computer readable storage medium storing one or more programs, the one or more programs comprising instructions, which, when executed by one or more processors, cause the processors to perform operations comprising:
at an apparatus:
receiving, from a first user, an application request for network medium data resources, the application request including a first screening condition of network medium data resources, the first screening condition including at least two screening dimensions from a set of screening dimensions of the network medium data resources;
after receiving the first screening condition:
receiving, from a second user, a user query for network medium data resources, the user query including a second screening condition of the network medium data resources, the second screening condition including at least two screening dimensions from the set of screening dimensions, wherein one or more of the at least two screening dimensions of the second screening condition overlap with one or more of the at least two screening dimensions of the first screening condition;
obtaining allocation data of the network medium data resources, the allocation data including at least allocatable network medium data resources within a predefined geographical region, allocatable network medium data resources associated with a predefined content, a total volume of the allocatable network medium data resources, and a set of ratios associated with the set of screening dimensions of the network medium data resources;
calculating an estimated allocatable resource volume of the network medium data resources for the second screening condition using the obtained allocation data of the network medium data resources;
calculating a conflict metric of the network medium data resources corresponding to the overlap between the first screening condition and the second screening condition, further including:
determining that the user query can be satisfied by network medium data resources other than the overlapped network medium data resources between the first screening condition and the second screening condition; and
removing the overlapped network medium data resources between the first screening condition and the second screening condition from the calculation of the conflict metric;
calculating a residual resource volume of the network medium data resources based on the conflict metric and the estimated allocatable resource volume for the second screening condition; and
determining an allocatable resource volume of the network medium data resources for the second screening condition based on the residual resource volume and returning, to the second user, information of the determined allocatable resource volume of the network medium data resources for the second screening condition.

14. The non-transitory computer readable storage medium of claim 13, wherein calculating the estimated allocatable resource volume of the network medium data resources for the second screening condition using the obtained allocation data of the network medium data resources includes:
in accordance with the second screening condition including the predefined geographical region, calculating a first estimated allocatable resource volume using the allocatable network medium data resources within the predefined geographical region and a ratio associated with the predefined geographical region;
in accordance with the second screening condition including the predefined content, calculating a second estimated allocatable resource volume using the allocatable network medium data resources associated with the predefined content and a ratio associated with the predefined content;
calculating a third estimated allocatable resource volume based on the total volume of the allocatable network medium data resources and the set of ratios excluding the ratio associated with the predefined geographical region and the ratio associated with the predefined content; and adding up the first, second, and third estimated allocatable resource volumes as the estimated allocatable resource volume of the network medium data resources for the second screening condition.

15. The non-transitory computer readable storage medium of claim 13, wherein the residual resource volume is calculated by subtracting the conflict resource volume from the estimated allocatable resource volume for the second screening condition.

* * * * *